United States Patent Office 3,468,830
Patented Sept. 23, 1969

3,468,830
CURING OF EPOXIDE RESINS WITH THE REACTION PRODUCT OF AN ORGANIC AMINE AND AN ALDEHYDE, AND CURING AND RESIN COMPOSITIONS AND PROCESS
Erika Kiss, Whitestone, N.Y., assignor to Pall Corporation, Glen Cove, N.Y., a corporation of New York
No Drawing. Filed Aug. 26, 1966, Ser. No. 575,506
Int. Cl. C08g 30/14, 45/10, 51/34
U.S. Cl. 260—29.2
15 Claims

ABSTRACT OF THE DISCLOSURE

Heat-activatable compositions for curing epoxide resins having the group

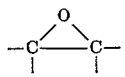

are provided comprising the reaction product of an organic amine curing agent and an aldehyde combined with a hydroscopic filler for epoxide resins. There is also provided a heat-curable epoxy resin composition comprising said reaction product and an epoxide resin and a process for curing epoxide resins using said reaction product.

---

This invention relates to heat-activatable curing agents for polymerizable polyepoxides, and to polymerizable polyepoxide compositions containing said curing agents which can be stored at room temperature, and to a process for forming the same.

Polyepoxide compositions are usually cured to hard and durable products, having excellent electrical and chemical resistivity, by admixing therewith just before shaping a measured amount of a curing agent, whereby the resin, frequently within an hour undergoes a further reaction at room temperature, and cures to a tough, hard, infusible product. The resinous composition cannot be mixed with the curing agent an appreciable time before use, since it may then set prematurely. The requirement that the polyepoxide composition and curing agent must be intimately admixed in specified proportions immediately before usage can present practical difficulties to some users, since the equipment required to intimately blend the polyepoxide composition and curing agent is often expensive. It would be advantageous, therefore, if the polyepoxide and curing agent could be premixed by the supplier prior to shipping to the molder, but it is then necessary to ensure that the premixed composition be stable and have a long enough storage life, in order that the composition not cure to an infusible, unworkable state prior to its being molded or otherwise worked into the desired product.

In every industry, the fact that the composition begins to cure immediately after mixing in the curing agent presents a problem since an unforeseen accident or delay can prevent its use before it is too late. This leads to waste, and to setting up in the wrong place with attendant cleaning problems. In a plant, it would be desirable to be able to initiate the cure only when desired, when the mix is prepared in advance as after application of a polyepoxide adhesive to the materials being joined, or after the polyepoxide composition is placed in a mold. Thus, in many situations there would be advantages in a stable premixed polyepoxide-curing agent composition.

It has been a long standing practice to mix partially polymerized curable resinous epoxide materials with various fluidizing diluents to make them less viscous, and thus extend the time during which they are workable after mixing in the curing agent. These diluents are generally added after the material has been partially polymerized but before the addition of the final curing agent, and are chosen for their compatibility with the resinous epoxides. Some are inert, while others are chosen for their desired effect on the finally cured product. Such diluents, as shown in U.S. Patent No. 3,016,362, include epoxidized soybean oil, acetone, methylethyl ketone, esters, diglycidyl ethers of polyhydric alcohols, ethers, and aromatic hydrocarbons and aldehydes, such as furfural. U.S. Patent No. 2,682,515 describes a resinous epoxide material containing furfural as a fluidizing diluent which is cured by the addition of a polyamine to the diluted polyepoxide.

According to the present invention, a heat-activatable curing agent for a polymerizable epoxide composition is provided which is substantially unreactive with polymerizable epoxides at room temperature or lower but which, when heated, will bring about a rapid cure. This will permit the preparation of a curable epoxide composition prior to the actual time of use, allowing sufficient time for shipment and storage before use, wherein the cure is initiated wherever and whenever desired merely by heating to a temperature above the activation temperature of the curing agent.

The heat-activatable curing agent is a blocked amine, wherein the amino nitrogen atoms having labile hydrogen atoms are blocked by forming a heat-decomposable bond to an α-hydroxy tertiary amino group, or an aldimino group. In the case of secondary amines, the blocking group is believed to be the α-hydroxy tertiary amino group, of the formula

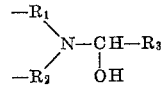

wherein $R_1$ and $R_2$ are organic radicals and $R_3$ is hydrogen or an organic radical. The organic radical can have from one to about fifty and preferably not more than twenty carbon atoms, and can be aliphatic groups and other non-aromatic linear or cyclic groups including nitrogen or oxygen atoms, cycloaliphatic, aromatic or heterocyclic groups. In the case of primary amines, the blocking group is an aldimino group, of the formula

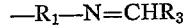

wherein $R_1$ is an organic radical and $R_3$ is hydrogen or an organic radical. The organic radicals can have from one to about fifty and preferably no more than twenty carbon atoms, and can be aliphatic groups and other non-aromatic linear groups including nitrogen or oxygen atoms, cycloaliphatic, aromatic or heterocyclic groups and combinations thereof.

The R groups can be any of the groups normally comprising amine curing agents such as alkyl, aryl, aralkyl, alkaryl, alkenyl, cycloalkyl, hydroxyalkyl, hydroxyphenyl, alkoxy, cycloalkoxy, and epoxy groups as well as additional amino groups, hydroxyl groups, carboxylic acid and ester groups, and carbonyl groups as in amido groups.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, butenyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, menthyl, and naphthenyl, hydroxyethyl, hydroxyhexyl, menthyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol; methoxy, n-butoxy, n-octyloxy, 2-ethylhexyloxy, n-decyloxy, phenoxy, benzyloxy, acetoxy, benzoyloxy; carboxypropyl, carboxyoctyl, propylcarbonyl, butylcarbonyl, methylcarbonyl, naphthylcarbonyl, phenylcarbonyl furfuryl, furyl, and tetrahydrofurfuryl.

The preferred blocked amine curing agents of this invention contain at least one aldimino group wherein the organic groups preferably contain up to thirty carbons. The blocked amine curing agent can also contain free secondary amine groups but preferably not more than one, and can also contain at least one α-hydroxy tertiary amino group.

To be suitable as a curing agent, the blocked amines must have at least two active nitrogen sites per molecule. An active nitrogen site is a site which will react with an epoxy group and is the equivalent to the nitrogen-hydrogen bond in the amino group, in an unblocked amine curing agent. An aldimino group has two active nitrogen sites on a single nitrogen atom and an α-hydroxy tertiary amino group one. These are respectively equivalent to primary amino and secondary amino groups in an unblocked amine curing agent.

It is suitable to use a blocked amine curing agent having more than one free secondary amino group if the storage period is not unduly long, as the curing rate is very slow for secondary groups. This is especially true where the curing agent contains at least one aldimino group and several α-hydroxy tertiary amino groups.

The blocked amine curing agent can be formed by reacting an aldehyde with an amine curing agent preferably at a temperature about or below room temperature. The preferred temperature range is 32° F. to 90° F. Preferably, there is a stoichiometric excess of aldehyde present in the reaction mixture. The aldehyde will react with each of the primary amino groups present in a combination reaction with the production of water and an aldimino group, and also with the secondary amino groups in a simple addition reaction to form an α-hydroxy tertiary amino group. The blocked amine is preferably a liquid miscible with the epoxy resin.

The aldehyde will react with primary amino groups as follows:

wherein the R groups are as defined above. The following addition reaction occurs between the aldehyde and secondary amino groups:

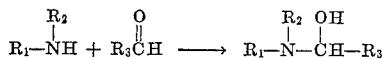

Therefore, the one mole of aldehyde is required for each of the primary and secondary amino groups present in the amine curing agent.

The amine curing agents commonly used for curing epoxides are primary and/or secondary polyfunctional amines, or amines having at least one primary and/or two secondary amino groups, i.e., two labile amino hydrogen atoms. These hydrogen atoms are replaced as shown above in forming the active nitrogen sites of the blocked amine curing agent of this invention. The amines generally used are polyamines containing at least two amino groups. Tertiary amino groups can be present, but are nonreactive.

Typical aliphatic primary and secondary amines include methylamine, ethylamine, propylamine, isopropylamine, butylamine, isobutylamine, 2-ethylhexylamine, 3-propylamine, butylamine, isobutylamine, 2-ethylhexylamine, 3-propylheptylamine, decylamine, dodecylamine, tetradecylamine, propyloxyethylamine and 2-ethyloxyhexylamine, acetamide, propionamide, and butylamide.

Examples of aromatic amines, such as aralkyl amines and alkaryl amines include, among others, aniline, o-hydroxyaniline, m-toluidene, 2,3-xylidene, benzylamine, phenethylamine, 1-naphthylamine, naphthylamide, benzylamide and isonicotinamide.

Illustrative cycloaliphatic amines include cyclopentylamine, cyclohexylamine, 2-methylcyclohepthylamine, 3-ethylcyclopentylamine and cyclohexanecarboxamide.

Among the polyamides, i.e., those having an average molecular weight range from about 300 to about 10,000, are included condensation products of polycarboxylic acids, in particular, hydrocarbon dicarboxylic acids, such as malonic acid, succinic acid, glutaric acid, adipic acid, dilinolenic acid, and the like, with polyamines, particularly diamines, such as ethylenediamine, propylenediamine and the like.

Aliphatic polyamines include ethylenediamine, propylenediamine, butylenediamine, pentylenediamine, hexylenediamine, octylenediamine, nonylenediamine, decylenediamine, diethylenetriamine, diethylethylenediamine, triethylenetetramine, dibutylpropylenediamine, tetraethylpentamine, dipropylenetriamine, di-2-ethylhexylbutylenetriamine, dimethylethylenediamine, butanetricarboxamide, malonamide, glycinamide and 2-acetamidohexanamide. Cycloaliphatic polyamines such as p-menthane-1,8-diamine, cyclohexylenediamine, ethylenecyclohexylenetriamine are also included.

Aromatic polyamines include meta-, ortho-, and para-phenylenediamines, 1,4 - naphthalenediamine, 3,4 - toluenediamine, 4,4'-methylenedianiline, 3,4-ethylphenylenediamine diphenylpropylphenylenediamine, phthalamide, naphthalamide, and 2,5-xylylenediamine.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenol, 4-aminophenol, 2,3-diaminoxylenol, and 2-hydroxycyclohexylamine.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxyalkyl, polyalkylene and arylene polyamines, which can be prepared by the addition reaction of polyalkylene polyamines, arylene polyamines, and the like. e.g., ethylene diamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms.

Examples of still other polyfunctional amines suitably adaptable include, among others, heterocyclic nitrogen compounds such as piperazine, 2,5-dimethylpiperazine, and the like; aminoalkyl-substituted heterocyclic compounds such as N-(aminopropyl)-morpholine, N-(aminoethyl)-morpholine, and the like; amino-substituted heterocyclic nitrogen compounds such as melamine, 2,4-diamino-6-(aminoethyl)pyrimidine, and the like; dimethylurea, guanidine, p,p' - sulfonyldianiline, 3,9-bis(aminoethyl)-spirobimetadioxane, hexahydrobenzamine, and others.

Other polyfunctional amines having a total of at least two active amino hydrogen atoms to the molecule can be employed in the epoxide compositions of this invention. For example, such polyfunctional amines as mixtures of p,p'-methylenedianiline and m-phenylenediamine, or other mixtures of two or more polyfunctional amines can be used.

The aldehyde can generally contain any of the groups named above in conjunction with the amines and can be an aliphatic aldehyde such as an alkyl aldehyde such as formaldehyde, acetaldehyde, propionaldehyde, butyraldehyde, valeraldehyde, capronaldehyde, heptaldehyde, chloracetaldehyde, nonaldehyde, octaldehyde, decaldehyde, octadecaldehyde; aromatic aldehydes such as benzaldehyde, derivatives such as p-methylbenzaldehyde, p-propylbenzaldehyde, salicylaldehyde and cinnamaldehyde; and unsaturated aldehydes such as acrolein, crotonaldehyde and α-β-dimethylacrolein

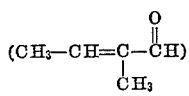

the cycloaliphatic aldehydes such as cyclohexanal and cyclopentanal, and the heterocyclic aldehydes, such as indole aldehydes, 3- and 6-carbonyl aldehydes, acridine 9-aldehyde, pyriol 2,5-dimethyl aldehyde, pyridine aldehydes, quinoline-2-aldehydes, isoquinoline-3-aldehyde and furfural. The aldehydes can be reacted individually with the amines or mixtures of aldehydes can be reacted if it is desired.

Preferred aldehydes include furfural, benzaldehyde and alkyl aldehydes preferably having between three and twenty carbon atoms.

The follownig are preferred blocked amines for use in the invention:

(1) 

(2) 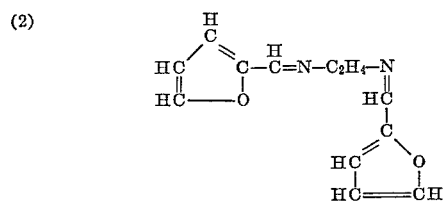

(3) 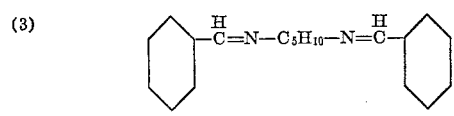

(4) 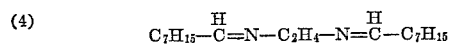

(5) 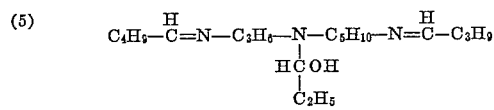

(6) 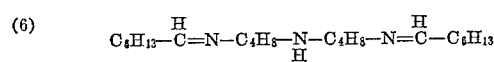

(7)

(8)

(9)

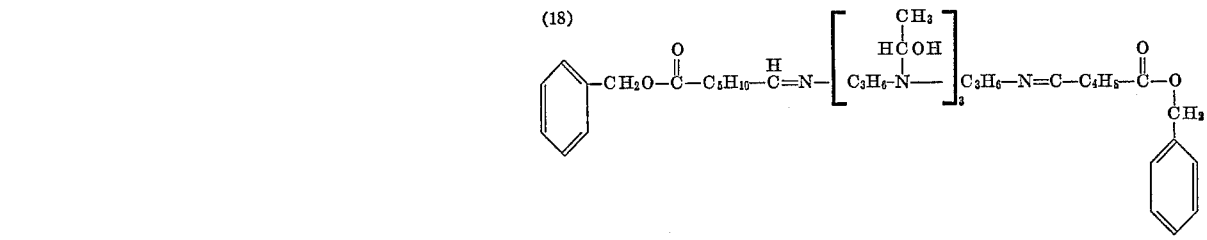

(10) 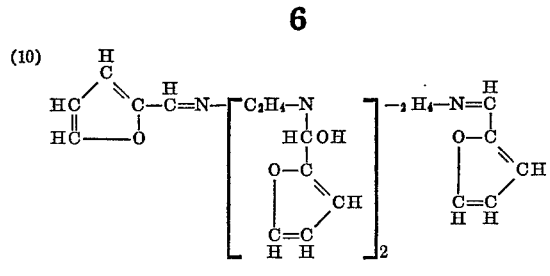

(11) 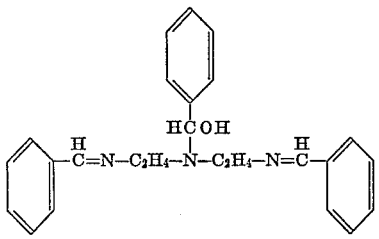

(12) 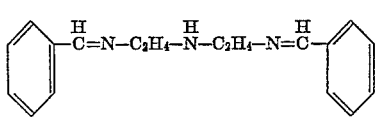

(13) 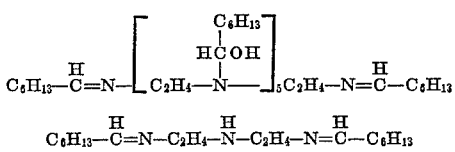

(14) 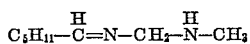

(15) 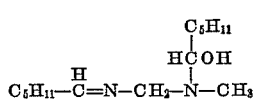

(16) 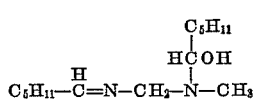

(17) 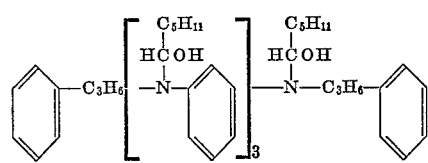

(18) 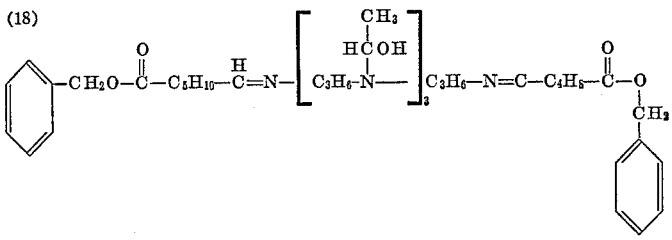

(19) 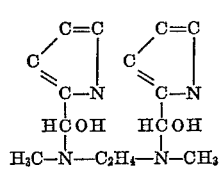

(20) 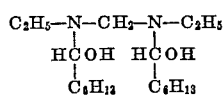

(21) 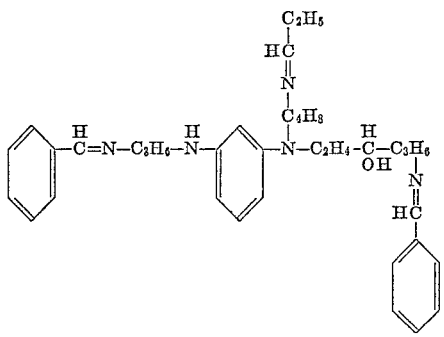

(22) 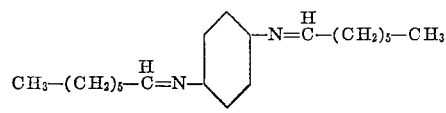

(23) 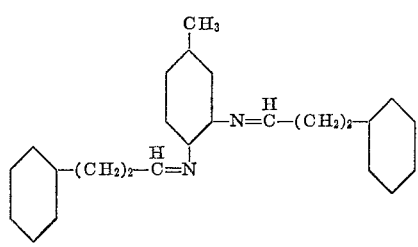

(24) 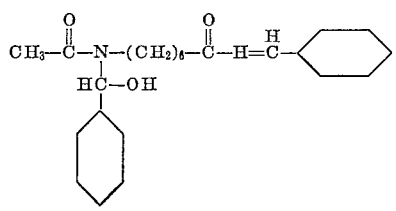

(25) 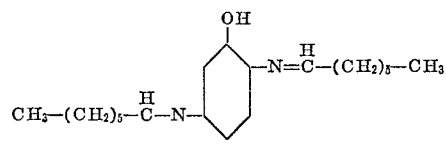

(26) 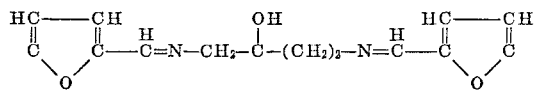

In accordance with the process of the invention, a cured polyepoxide is obtained by admixing a heat-activatable blocked amine curing agent with a polymerizable epoxide. The polymerizable epoxide is preferably partially polymerized before it is mixed with the curing agent, and may therefore be considered a polymerizable polyepoxide in the preferred embodiments. The epoxide-curing agent composition is then cured when desired by heating to a temperature above the heat-activation temperature of the curing agent, which preferably is substantially above room temperature, and, for best results, in the range of 150° F. to 300° F. It is also preferred to have a certain amount of water in the epoxide-curing agent mixture during curing, preferably at least the stoichiometric amount of water released during the formation of the retarded hardener. This allows the cure to progress at a reasonable rate and at a lower temperature.

This heat-activatable curing agent can be mixed with the polymerizable epoxide, which mixture is then curable by raising the resin temperature to a value above the activation temperature for the particular blocked amine used. At room temperature, however, this mixture of polymerizable epoxide with heat-activatable curing agent will remain in the uncured state and usable for a substantial period of time. By storing under refrigerated conditions of approximately 32° to 40° F., the material will remain usable in the uncured state for an even more extended period of time. By the term "usable," it is meant that the curable epoxide is sufficiently fluid to allow forming as by molding or extruding or spreading of the epoxide, depending on the use intended. Heretofore, as soon as curing material was added to the epoxide it began to cure rapidly and shortly became too hard to be easily worked.

The amount of blocked curing agent added to the polymerizable epoxide is determined by the equivalent amount of amine curing agent required for the curing of the epoxide. Upon being heated to the activation temperature, the blocked amine is apparently decomposed and amine is liberated to cure the epoxide. Therefore, the blocked amine may be presumed to be the amine for the purpose of determining stoichiometric equivalents. Generally, the blocked amine hardeners are added to the epoxide in sufficient molar quantities to provide from 0.2 to 5.0 and preferably 0.3 to 3.0 amino hydrogens for each epoxy group contained in the epoxide.

The blocked amine curing agents of this invention are useful for resins useful for casting, encapsulation and foaming as well as for slurried resins useful as adhesives or for the coating of other porous materials such as paper or fabrics. The slurried materials for coatings or adhesives can be mixed in an organic solvent carrier or they can be in an aqueous carrier. In each of these types of resin, the blocked amine hardener significantly extends the useful life of the epoxide resin after the hardener has been mixed in. It has been found, however, that the blocking agent extends the life of the epoxide resin for a longer period in moisture-free, anhydrous systems. As shown above, the cure is facilitated by the addition of a small amount of water to the system.

Accordingly, when a non-aqueous system is used, the addition of a hygroscopic reactive filler will aid in keeping the system moisture-free. The reactive filler will preferentially take up any moisture absorbed by the curing agent-epoxide composition. This filler can be added with the blocked amine to the polymerizable epoxide. It is, therefore, preferable to premix the blocked amine with the filler and add this composition to the resin. The filler is also useful during storage of the curing agent alone to keep it dry and stable before it is added to the polymerizable epoxide. The hygroscopic filler is preferably added in amounts in the range of about 5 to about 100 percent by weight based on the blocked amine. However, the amount is not critical and is determined by such factors as the storage conditions and the final use to which the cured resin will be put. Polyepoxides generally contain up to 60% filled material, and this may be all hygroscopic filler if desired.

Hygroscopic filler materials suitable for use in this invention include the oxides of the alkaline earth metals, such as CaO, MgO, BaO, ZnO, as well as $NaSO_4$ and portland cement.

As shown above, there is one mole of water formed for each equivalent of primary amine reacted when forming the blocked amine by the above process. To obtain the maximum benefit from this invention in non-aqueous epoxide resin systems, the blocked amine hardener should be substantially anhydrous when mixed with the epoxide. This water, therefore, is preferably removed before the curing agent is added to the epoxide. The water can be removed, for example, by azeotropically distilling the water with benezene added to the reaction mixture, and removing the water in a water trap. Any small remaining quantities of water can be removed by adding any of the reactive fillers described above to the blocked amine reaction product. The reactive filler can thus be added to remove the water of reaction, as well as to prevent the absorption of any additional moisture during storage.

The blocked amine is preferably homogeneously mixed with the polymerizable epoxide to insure a regular and even curing of the resin upon the application of heat. The blocked amine can be mixed into the polymerizable epoxide with a reactive filler to insure that the epoxide is kept anhydrous, or they can be mixed without the anhydrous filler and stored under dry conditions. It is, of course, preferable to include a reactive filler and thus increase the storage versatility of the mixed resin. The presence of moisture in the epoxide will normally decrease the time during which the mixture of aldimine and epoxide may be stored without danger of curing.

The reactive filler can be mixed with the resin before or after the addition of the curing agent, or with the curing agent.

Additional inert fillers useful for both aqueous and nonaqueous epoxide systems include finely divided silica, such as Cab-O-Sil, diatomaceous earth, fuller's earth, asbestos fibers, potassium titanate (typersul fibers), Albalith, flint powder, quartz, kryolite, barytes, atomized aluminum, wood flour, glass fibers, rayon fibers, nylon fibers, powdered aluminum, powdered iron, powdered alumina and magnesia, calcium carbonate, iron oxide, clays, nylon and mica.

The blocked amine curing agents of the invention are effective in the curing of any polyepoxides containing at least one reactive epoxy group

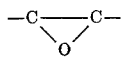

in their molecule. The epoxy groups can be contained in any type of organic compound having, for example, a saturated or unsaturated aliphatic, cycloaliphatic, aromatic or heterocyclic structure, and these compounds can include other substituents which are inert to the epoxide unit, such as chlorine atoms, oxy ether or thioether groups. The polyepoxides can be monomeric or polymeric.

Preferably, the polyepoxides useful in this invention have an epoxide equivalent weight of less than 10,000. The polyepoxide can be a definite single compound having a specific molecular weight, or it can be a mixture of partially polymerized polyepoxides containing macromolecules of different molecular weight and epoxide equivalent.

Exemplary of the polyepoxides to which the invention is applicable are epoxidized triglycerides. These are the epoxidized esters of saturated polyhydroxy alcohols and phenols, and ethenoid carboxylic acids. Appropriate are epoxidized esters of triphenylcarbinol, ethylene glycol, propylene glycol, hexamethylene glycol, glycerol, trimethylolpropane, triethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, such as neopentylglycol, the hexanediols, ricinoleyl alcohol, 1,2,3-propanetriol, trimethylolmethane, 1,1,1-trimethylolethane, 1,1,1-trimethylolpropane, 1,2,6-hexanetriol, cycloaliphatic triols such as 1,2,3-cyclohexane triol with the monoethenoid monocarboxylic fatty acids, such as dodecenoic, palmitoleic, oleic, elaidic, erucic, crotonic, 3-butenoic, angelic, 2-nonenoic, 3-hexenoic, tetradecenoic, the cyclohexenecarboxylic acids, such as 3-cyclohexenecarboxylic acid, cyclohexeneacetic acid and cyclopentenetridecanoic acid, the polyethenoid monocarboxylic fatty acids, such as sorbic, linoleic, linolenic, and arachidonic acid; and the substituted mono- and polyethenoid monocarboxylic acids, such as ricinoleic, brassidic and licanic acid. Ethenoid dicarboxylic acids include heptadienedioic, octenedioic, nonenedioic and undecenedioic. Representative epoxidized esters falling under this group include epoxidized glycerol trioleate, epoxidized glycerol tridodecenoic, ethylene glycol dihexenoic, pentaerythritol tetranitrate, butyl-9,10,12,13-diepoxystearate; octyl - 9,10,12,13 - diepoxystearate; butyl - 9,10 - epoxypalmitate; butyl-9,10,12,13,15,16-triepoxystearate; butyl-12-hydroxy-9,10-epoxystearate; and butyl-12-acetoxy-9,10-epoxystearate; 1,2-bis(2,3-epoxy propoxy) diphenyl ether, 1,8-bis(2,3-epoxy propoxy) octane, 1,4-bis(2,3-epoxy propoxy) cyclohexane, and 1,3-bis(4,5-epoxy pentoxy) 5-chlorobenzene, the epoxy polyethers of polyhydric phenols obtained by reacting a polyhydric phenol or alcohol with a halogen-containing epoxide or halohydrin, such as the reaction products of resorcinol, catechol, hydroquinone, methyl resorcinol or polynuclear phenols such as 2,2'-bis(4-hydroxy phenyl) propane (Bisphenol A), 2,2'-bis(4-hydroxy phenyl) methane (Bisphenol F), 2,2'-bis(4-hydroxy phenyl) butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorhydrin.

A further group of the polyepoxides comprises the polyepoxy polyesters obtained by esterifying a polycarboxylic acid with an unsaturated epoxidizable alcohol, such as, for example, the diglycidyl ester of adipic acid, the diglycidyl ester of malonic acid, the diglycidyl ester of succinic acid, di(2,3-epoxybutyl)adipate, di(2,3-epoxycinnamyl)adipate and di(2,3-epoxybutyl)phthalate, the epoxides of pentaerythritol tetratallate, 2-acetoxyethyl-9,10-epoxy-12-acetoxyoctadecanoate, 2-propionyloxyethyl-9,10-epoxy-11-acetoxyoctadecanoate, and other such epoxy compounds. Other epoxides are epoxidized alkyl esters of tetrahydrophthalic acid or anhydride, wherein the alkyl group can contain up to thirty carbon atoms. Illustrative of such epoxides are di(methyl)3,4-epoxyhexahydrophthalate, di(decyl)3,4 - epoxyhexahydrophthalate and di(isodecyl)3,4-epoxyhexahydrophthalate.

Other polyepoxides include the polyetpoxypolyhydroxy polyethers obtained by reacting, preferably in an alkaline medium, a polyhydric alcohol or polyhydric phenol with a polyepoxide, such as the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxypropyl) ether.

Still another group of epoxy compounds which can be stabilized in this invention includes the epoxidized esters of ethenoid alcohols and ethenoid carboxylic acids. Typical epoxidized esters are those of the monoethenoid monohydroxy alcohols, such as crotyl, oleyl, citronellyl and cinnamyl alcohol, with the monoethenoid monocarboxylic fatty acids, such as dodecenoic, palmitoleic, oleic, eladic and erucic acid; the polyethenoid monocarboxylic acids, such as sorbic, linoleic, linolenic, and arachidonic; and the substituted monoethenoid monocarboxylic acids, such as ricinoleic and licanic acid. Illustrative epoxidized esters which are classified under this group include 2,3-epoxybutyl-9,10-epoxypalmitate; 2,3-epoxybutyl-9,10-epoxystearate; 2,3 - epoxybutyl - 9,10,12,13 - diepoxystearate; 2,3-epoxybutyl-9,10,12,13,15,16-triepoxystearate; 2,3 - epoxybutyl-12-hydroxy-9,10-epoxystearate; 2,3-epoxybutyl - 12-acetoxy - 9,10 - epoxystearate; 2,3-epoxycinnamyl-9,10-epoxypalmitate; 2,3-epoxycinnamyl-9,10,12,13-diepoxystearate; 2,3-epoxybutyl-2,3-epoxysuccinate; and di(2,3-epoxybutyl)-2,3-epoxyoctanoate.

Another group comprises epoxidized high molecular weight olefins, diolefins and polyolefins, such as 1,2-epoxyoctadecane, 1,2,11,12 - diepoxytetradecane, epoxidized polybutadiene and butadiene-styrene copolymers.

Illustrative polyepoxides include, for example, the alkanediol bis(3,4-epoxycyclohexanecarboxylates), the alkanediol bis(lower alkyl substituted -3,4-epoxycyclohexanecarboxylates), the oxoalkanediol bis(lower alkyl substituted -3,4-epoxycyclohexanecarboxylate), the alkanetriol tris(3,4-epoxycyclohexanecarboxylates) and the alkenetriol tris(3,4-epoxycyclohexanecarboxylates);

bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) maleate, bis(3,4-epoxycyclohexylmethyl) tetrahydrophthalate,
bis(3,4-epoxycyclohexylmethyl) citraconate,
bis(3,4-epoxycyclohexylmethyl) isocitraconate,
bis(3,4-epoxy-6-methylcyclohexylmethyl) fumarate,
bis(3,4-epoxycyclohexylmethyl) pimelate,
bis(3,4-epoxycyclohexylmethyl) terephthalate,
bis(3,4-epoxycyclohexylmethyl) azelate,
bis(3,4-epoxycyclohexylmethyl) sebacate,
bis(3,4-epoxycyclohexylmethyl) itaconate,
bis(3,4-epoxycyclohexylmethyl) hexahydrophthalate,
bis(3,4-epoxycyclohexylmethyl) phthalate,
bis(3,4-epoxycyclohexylmethyl) gultaconate,
bis(3,4-epoxycyclohexylmethyl) hydromuconate, and the like.

Other desirable polyepoxides include the monoesters of 3,4-epoxycyclohexylmethanols, and 3,4-epoxycyclohexane-carboxylic acids such as, for example, 3,4-epoxycyclohexylmethyl 3,4-epoxycyclohexanecarboxylate,
1-methyl-3,4-epoxycyclohexylmethyl 1-methyl-3,4-epoxycyclohexanecarboxylate,
6-methyl-3,4-epoxycyclohexylmethyl-6-methyl-3,4-epoxycyclohexanecarboxylate,
2-ethyl-3,4-epoxycyclohexylmethyl-2-ethyl-3,4-epoxycyclohexanecarboxylate,
4-n-propyl-3,4-epoxycyclohexylmethyl 4-n-propyl-3,4-epoxycyclohexanecarboxylate,
5-isobutyl-3,4-epoxycyclohexanecarboxylate, and other lower alkyl substituted-3,4-epoxycyclohexylmethyl lower alkyl substituted-3,4-epoxycyclohexanecarboxylate, halo - substituted - 3,4 - epoxycyclohexylmethyl halo-substituted-3,4-epoxycyclohexanecarboxylate, 1-chloro-3,4-epoxycyclohexylmethyl 1-chloro - 3,4 - epoxycyclohexanecarboxylate, 2 - bromo-3,4-epoxycyclohexylmethyl-2-bromo-3,4-epoxycyclohexanecarboxylate, and the like.

One group of partially polymerized polyepoxides comprises the hydroxy-substituted polyepoxy polyethers obtained by reacting, preferably in an alkaline medium, a slight excess, e.g. 0.5 to 3 mol excess, of a halogen-containing epoxide as described above, i.e. a halohydrin with any of the aforedescribed polyhydric phenols, such as resorcinol, catechol, Bisphenol A, bis[4-(2′-hydroxynaphth-1-yl)-2-2-hydroxynaphth-1-yl] methane and the like.

The reaction can be carried out in the presence of inorganic bases such as sodium or potassium hydroxide, preferably with a stoichiometric excess of the halohydrin. The reaction is preferably accomplished at temperatures within the range from 50 to 150° C., and after several hours reaction the product is washed free of salt and base (for example, see U.S. 3,018,262).

The product of the above described reaction is not generally a single compound but a complex mixture of glycidyl polyethers; the principal product can be represented by the formula:

wherein $n$ is an integer of the series 0, 1, 2, 3 . . ., and R represents a divalent hydrocarbon radical of a polyhydric compound and preferably a dihydric phenol. While for any single molecule $n$ is an integer, the fact that the obtained polyether is a mixture of compounds causes the determined value for $n$, e.g. from molecular weight measurement, to be an average which is not necessarily zero or a whole number. The above polyepoxides are then further polymerized by curing in accordance with the invention.

The epoxide resins prepared by the above reactions are sold under trade names. Data on several types are given in Table I below, in which the expression "epoxide equivalent" means the grams of resin containing one molar equivalent of epoxide.

TABLE I

| Trade name and number | Epoxide equivalent wt. | Viscosity,[1] 25° C., poise | M.P., ° C., Durran mercury method |
|---|---|---|---|
| Epon 815 | 175–195 | 5–9 | Liquid |
| Epon 828 | 180–195 | 100–160 | Liquid |
| ERL 2772 | 185–200 | 105–195 | Liquid |
| Epon 834 | 225–290 | 3.75–8.75 | Liquid |
| Epon 1001 | 425–550 | 1.0–1.7 | 65–75 |
| Epon 1002 | 550–700 | 1.7–3.0 | 95–105 |
| Epon 1004 | 875–1,025 | 4.6–6.6 | 125–135 |
| Epon 1007 | 2,000–2,500 | 18–28 | 75–85 |
| ERL 2774 | 185–195 | 110–135 | |
| ERL 0500 | 100–125 | 18.2–49.2 | |
| ERL 3794 | 174–186 | 70–190 | |

[1] In measuring the viscosities of Table I, the Gardner-Holt bubble tube was used. The viscosities of Epon 815, Epon 828, and ERL 2772 are in pure resin, Epon 834 on 70% weight solution in butyl carbitol, and all other types on 50% weight solution in butyl carbitol.

To facilitate mixing of the curing agent, reactive filler and epoxide, it is desirable to have the epoxide in a fluid condition. Liquid polyepoxides that are too viscous for ready mixing may be mixed with a liquid solvent or fluidizing diluent to reduce viscosity. Normally solid polyepoxides are either melted or dissolved in a suitable solvent before mixing. Solvents for the epoxides are well known. Any of the solvents mentioned in U.S. Patent No. 2,768,153 to Shokal, patented Oct. 23, 1956, or in U.S. Patent No. 3,018,258 to Meier et al., patented Jan. 23, 1962, can be employed.

In many cases, it is convenient to employ a combination of a solid or semi-solid polyepoxide and a liquid polyepoxide such as a normally liquid glycidyl polyether of a polyalcohol such as an n-butyl glycidyl ether, linonene dioxide, alpha pinene oxide and the epoxidized higher olefins such as 1,2-epoxyhexadecane. For certain uses it is also convenient to use an excess of the aldehyde when forming the blocked amine to serve as a fluidizing diluent if it is miscible. Another preferred diluent when dealing with very high melting epoxies is a normally liquid aliphatic polyepoxide as disclosed in U.S. Patent No. 2,683,515.

In addition to the above described materials, there is usually added to the resinous epoxide material prior to curing catalysts, initiators, and additional inert fillers. The catalysts serve to increase the rate of reaction between the curing agent and the epoxy material. The true catalysts are not changed as a result of the reaction and include: $BF_3$, particularly when complexed with amines, polyvalent metal salts of organic acids, organic acids and neutral phosphites. Materials which initiate the reaction by taking part in it but which are changed during the course of the reaction are also sometimes called "catalysts" but are really initiators. Examples of these materials include: alphamethyldibenzyldimethylamine, diethylaminopropylamine, dimethylaminoethylphenol. These amino groups are, however, preferably tertiary amines or primary or secondary in the form of a blocked amine. Both of these types of catalysts are used in amounts far less than stoichiometric, within the range from about 0.01 to about 10% by weight of the polyepoxide.

Inert fillers, dyes, pigments and other modifying agents can be added to the polyepoxide compositions. The filler can improve the strength, heat resistance and chemical resistance of the final cured polyepoxide produced. A filler is also added as an economy measure, decreasing the amount of the more expensive polyepoxide in the compositions.

The above supplementary materials can be used singly or in combinations of two or more in the resin. These materials can be added directly to the epoxide, or they can be mixed with the curing agent and then added to the epoxide.

The particular blocked amine, reactive filler and other supplementary materials chosen depend upon the particular use to which a resin composition is to be put. For example, if the resin composition is to be used in the packaging of food, the materials chosen should be non-toxic and preferably nonmigratory. An example of this type of combination would be a blocked amine, such as the compound shown in Formula 2, above, and an epoxy resin formed of a diglycidyl ether of epichlorhydrin and Bisphenol F.

The following examples in the opinion of the inventor show preferred embodiments of this invention:

EXAMPLE 1

A glycidyl polyether type of polyepoxide resin was prepared as follows: About 2 moles of 2,2'-bis(p-hydroxy phenyl) methane was dissolved in 10 moles of epichlorhydrin and 1 to 2% water added. The mixture was then brought to 80° C., and 4 moles of solid sodium hydroxide added in small portions over a period of about one hour. During the addition, the temperature of the mixture was held at about 90 to 110° C. After the sodium hydroxide had been added, the water formed in the reaction and most of the excess epichlorhydrin was distilled off. The residue that remained was combined with an approximately equal quantity by weight of benzene, and the mixture filtered to remove the salt. The benzene was then removed, leaving a viscous liquid having an epoxy value equivalent of 180.

A portion of the epoxidized bisphenol so produced was mixed in the proportion of 23 parts by weight with 25 parts of blocked amine curing agent formed by the following process:

Diethylenetriamine was reacted with furfural in a molar ratio of approximately 3:1 in anhydrous benzene. The material was stirred while being reacted at room temperature. It was then refluxed with a water trap for a period of twenty-four hours to remove most of the water of reaction. The blocked amine, $N^1,N^3$-di(methyl furfuryl)-$N^2$(hydroxy methylene furfuryl) was separated from the benzene, and mixed with calcium oxide. The oxide and blocked amine mixture was then compounded with the resin produced in Example 1, and with furfuryl alcohol to produce the following epoxy composition:

| Ingredients | Parts by weight |
|---|---|
| Resin | 23 |
| Blocked amine-$N^1,N^3$-di(methyl furfuryl) - $N^2$-(hydroxy methylene furfuryl) diethylene - triamine | 25 |
| Furfuryl alcohol | 2.5 |
| Calcium oxide | 50 |

A control epoxide resin composition was prepared identical to the above but substituting for the blocked amine the equivalent weight of diethylenetriamine and furfural used to produce the blocked amine used in the first composition. A portion of the composition of the invention and a portion of the control composition were stored at room temperature. The control composition was found to have hardened to an unusable state after six hours. The composition of the invention was still in a workable condition, suitable for use, after two days.

A second portion of the mixture of the invention was then heated to 290° F. and after 40 minutes was cured to the desired hardness.

EXAMPLE 2

A second portion of the glycidyl polyether formed in Example 1 was then mixed in the proportion of 36.5 parts by weight with 38 parts by weight of blocked amine curing agent formed from 7 parts of triethylanetetramine and 31 parts of furfural in a process similar to that in Example 1. A heat-activatable polymerizable resinous epoxide mixture was formed having the following composition:

| Ingredients | Parts by weight |
|---|---|
| Resin | 36.5 |
| Ultramarine blue | 38 |
| Blocked amine-$N^1,N^4$ - di(methylenefurfural)-$N^2,N^3$-di(hydroxymethylene furfuryl) | 8 |
| Furfuryl alcohol | 3.7 |
| Calcium oxide | 33 |

A similar epoxy resin composition was formed identical to the above with the exception that the blocked amine was replaced with the equivalent amount of furfural and triethylentetramine. Water was added to the composition of the invention whereupon it was heated to 210° F., and hardened after four minutes. A second portion of the composition of the invention and the control composition were stored at room temperature. The composition of the invention was still usable after two days of storage, and the control composition was found to be unusable after six hours.

EXAMPLE 3

A third portion of the epoxide resinous material was mixed with blocked amine formed as in Example 2.

A blocked amine catalyst was formed by reacting 2.4 parts of a boron trifluoride-ethyleneamine 1:1 complex with six parts of furfural at room temperature, dissolved in anhydrous benzene. The benzene reactants were refluxed for twenty-four hours and the blocked amine reaction product was separated out and compounded with calcium oxide as in Example 2. This blocked amine was then mixed with the blocked amine of Example 2 and added to the resin with furfuryl alcohol to form the following epoxide composition:

| Ingredients | Parts by weight |
|---|---|
| Resin | 21 |
| Blocked amine-$N^1,N^4$-di(methylene furfuryl)-$N^2,N^3$ - di(hydroxymethylene furfuryl) triethylene-tetramine | 12.5 |
| $BF_3MEA$+furfural (catalyst) | 7 |
| Calcium oxide | 55 |

A portion of this resin mixture was stored at room temperature and was found to be still usable after two days. A control sample, as in the earlier examples, similar to the compositions of the invention but substituting unreacted aldehyde and amine for the blocked amine, was also stored at room temperature and was found to be unsuitable for further use after six hours. A second portion of the composition of the invention was heated to 250° F. and was found to cure to a suitable degree of hardness after two minutes.

EXAMPLE 4

The epoxy resin formed in Example 1 is mixed with a blocked amine formed by reacting 25 parts of heptanal with 5 parts of ethylenediamine, also as in Example 1. To this mixture of the resin and blocked amine is added furfuryl alcohol and calcium oxide to form the following resin composition:

| Ingredients | Parts by weight |
|---|---|
| Resin | 25 |
| Blocked amine - $N^1,N^2$ - di(methylene hexane) ethylenediamine | 30 |
| Furfuryl alcohol | 3 |
| Barium oxide | 42 |

A similar composition identical to the above, but having substituted for the blocked amine an equivalent amount of heptanal and ethylenediamine, is also compounded as in Example 1. Portions of each of the composition of the invention and the control composition are stored at room temperature. The control composition hardens so as to be unusable after five hours. The composition of the invention is still in usable condition after two days.

A portion of the composition of the invention heated to 250° F. is cured to a suitable degree of hardness after three minutes.

EXAMPLE 5

A blocked amine, $N^1,N^2$-di(benzylidene) ethylene diamine is prepared by reacting benzaldehyde with menthane diamine at 35° F. A composition similar to Example 4, but substituting the above blocked amine is then prepared. A control sample similar to that in Example 4 is also prepared with the benzaldehyde being substituted for the heptanal.

Portions of the control sample and of the composition of the invention are stored at room temperature. The control composition hardens to a degree rendering it unusable after one hour. The composition of the invention is still in a usable condition after two days.

A second portion of the composition of the invention heated to 250° F. cures to a satisfactory degree of hardness after two minutes.

EXAMPLE 6

An epoxy resin composition is prepared from liquid glycidyl polyether of epichlorhydrin and butanediol. A blocked amine curing agent is formed by the reaction of furfural and diethylene triamine, according to the procedure of Example 1 above. The following epoxy resin composition is formed:

| Ingredients | Parts by weight |
|---|---|
| Resin | 25 |
| Blocked amine-diethylene triamine furfural | 30 |
| Calcium oxide | 42 |
| Furfuryl alcohol | 3 |

A portion of the above resin mixture was still in a usable condition after being stored at room temperature for three days. A second portion heated to 375° F. cured within 45 minutes.

EXAMPLE 7

Aqueous based epoxy resin slurries for use as adhesives can be prepared using the epoxy resin of Example 1. A blocked amine curing agent is formed by reacting furfural with an amine curing agent as set forth in Example 1 and the blocked amine is then added to the resin composition. The resin has the following formulation:

| Ingredients | Parts by weight |
|---|---|
| Blocked amine—furfural 28.5 triethylene tetramine 5.5 | 34 |
| Epoxy resin | 11.4 |
| Butylcarbitol | 45.5 |
| Cab-O-Sil No. 5 (colloidal silica) | 4.6 |
| Wood Flour | 4.5 |
| Water | 1000 |

The above resin formulation formed a stable suspension and was still in a usable condition after being left standing at room temperature for more than a full day; upon being heated to 375° F., it cured within 45 minutes.

A control composition was prepared similar to the above but substituting for the blocked amine separate portions of furfural and the amine curing agent. Upon being left standing at room temperature, the control composition set to a point where it was no longer usable after about six hours.

EXAMPLE 8

Another portion of an aqueous slurry of an epoxide resin containing a blocked amine hardener was prepared to test the adhesive qualities of the resin after being allowed to stand for a full day. The resin had the following formulation:

| Ingredients | Parts by weight |
|---|---|
| Epoxy resin | 10 |
| Butyl carbitol | 15 |
| Trichloroethylene | 5 |
| Cab-O-Sil (colloidal silica) | 1 |
| Blocked amine—3 parts menthane diamine, 7.5 parts furfural | 14 |
| 1/32 milled glass fiber | 2.5 |
| Diatomaceous earth (Special Speedflow) | 7 |
| Potassium titanate (fibers) | 0.47 |
| Water | 950 |

The above water-based epoxy formulation formed a stable suspension in water and did not set at room temperature after being left standing for more than a full day. A control composition similar to the above but substituting the same proportions of the amine curing agent and furfural not previously mixed and reacted, was not in a usable condition after being left standing for six hours.

To further test the suitability of the above composition as an adhesive agent, a portion was used to attach a filter element to a back-up plate. A lay-down of resin of 15 g. per square foot was applied. The material was cured for 60 minutes at 375° F. and tested by applying a back pressure to the filter to determine the adhesive force between the paper and the backing. A portion of the resin was cured the same day and tested and a second portion was cured after being left standing for a day. In both cases the adhesion was not broken even at a 50 p.s.i. pressure drop. At that point however, the paper broke and the test had to be discontinued. This is considered an excellent adhesion characteristic for this adhesive.

EXAMPLES 9 THROUGH 14

Epoxy resin compositions were prepared using the Bisphenol F glycidyl polyether resin formulation of Example 1. The blocked amine agents set forth in Table I were mixed with the resin in the proportions shown.

The blocked amine curing agent was prepared in the manner disclosed in the previous examples from the components set forth in Table II. In each case, a portion of the resin formulation was mixed with the blocked amine and a second portion of the resin formulation was mixed with an equal quantity of the aldehyde and the amine curing agent added separately. The control compositions were found to become substantially unusable within six hours of standing at room temperature. The materials containing the blocked amine agent of this invention were found to be usable after standing for two days at room temperature.

TABLE II

| Example | Ingredients | Parts by wt. |
|---|---|---|
| 9 | Polyglycol diamine (molecular weight 221) benzaldehyde. | 10<br>22 |
| 10 | Thionol ethylated diethylene triamine (ZZL0803) heptanol. | 15<br>60 |
| 11 | Hydroxy-ethylated diethylene triamine (2 mols ethylene oxide plus 1 mol DETA) DETA) furfural). | 15<br>55 |
| 12 | Eutectic blend of aromatic amines (ZZL-0820) (4,4'-methylene dianiline cyclohexanal. | 20<br>50 |
| 13 | m-Phenylene diamine (Tonox) furfural | 20<br>40 |
| 14 | Methylphenylene diamine benzaldehyde | 10<br>43 |

Having regard to the foregoing disclosure, the following is claimed as the inventive and patentable embodiments thereof:

1. A heat-activatable composition for curing anhydrous polymerizable epoxide resins having the group

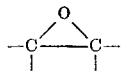

comprising the reaction product of an aldehyde and an organic amine curing agent having amino groups normally reactive at room temperature with the epoxide resins, the organic amine and the aldehyde being selected from the group consisting of aliphatic, aromatic, cycloaliphatic, aliphatic-aromatic and heterocyclic aldehydes and amines and hydroxy-substituted such compounds, in a molar equivalent ratio of at least one equivalent of aldehyde per amino group of the amine, the reaction product being substantially unreactive at room temperature with the epoxide resin but heat-activatable to cure the epoxide at an elevated curing temperature, substantially above room temperature, and a hydroscopic filler for epoxide resins in an amount to maintain the composition substantially anhydrous.

2. A heat-curable epoxide resin composition comprising a polymerizable epoxide resin having the group

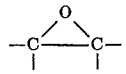

and being curable by an amine curing agent, and the reaction product of an aldehyde and an organic amine curing agent, having amino groups normally reactive with the epoxide resin, the organic amine and the aldehyde being selected from the group consisting of aliphatic, aromatic, cyclo-aliphatic, aliphatic-aromatic and heterocyclic aldehydes and amines and hydroxy-substituted such compounds, in a molar equivalent ratio of at least one equivalent of aldehyde per amino group of the amine, the reaction product being substantially unreactive at room temperature for the epoxide resin but heat-activatable to cure the epoxide at an elevated curing temperature, substantially above room temperature.

3. The heat-curable epoxide composition of claim 2 in a substantially anhydrous condition.

4. The heat-curable epoxide resin composition of claim 2 in the form of an aqueous slurry of the epoxide resin and the reaction product.

5. The heat-curable epoxide resin composition of claim 2 wherein the amine contains at least two primary amino groups and at least one secondary amino group.

6. The heat-curable epoxide resin composition of claim 5 wherein the aldehyde is a heterocyclic aldehyde and the amine is an alkyl amine.

7. The heat-curable epoxide resin composition of claim 5 wherein the aldehyde is an aromatic aldehyde and the amine is an alkyl amine containing up to about forty carbon atoms.

8. The heat-curable epoxide resin composition of claim 5 wherein the aldehyde is an aliphatic aldehyde and the amine is an alkyl amine containing up to about forty carbon atoms.

9. The heat-curable epoxide resin composition of claim 2 containing excess aldehyde as a solvent diluent for the epoxide resin.

10. The heat-curable epoxide composition of claim 2 containing an unreactive filler, a liquid epoxy diluent and a dye.

11. The heat-curable epoxide composition of claim 2 formed as an aqueous slurry.

12. The heat-curable epoxide composition of claim 11 containing an unreactive filler.

13. The heat-curable epoxide resin composition of claim 5 wherein the aldehyde is furfuraldehyde and the amine is diethylene triamine.

14. A process for curing a polymerizable epoxide resin comprising mixing a polymerizable epoxide resin curable by an amine curing agent with the reaction product of an aldehyde and an organic amine curing agent having amino groups normally reactive at room temperature with the epoxide resin, the organic amine and the aldehyde being selected from the group consisting of aliphatic, aromatic, cycloaliphatic, aliphatic-aromatic and heterocyclic aldehydes and amines and hydroxy-substituted such compounds, in a molar equivalent ratio of at least one equivalent of aldehyde per amino group of the amine, the reaction product being substantially unreactive at room temperature with the epoxide resin but heat-activatable to cure the epoxide at an elevated curing temperature, substantially above room temperature, heating the mixture to the curing temperature, and curing the mixture until the desired hardness is reached.

15. The process of claim 14 wherein water is added to the epoxide mixture prior to heating to the curing temperature.

References Cited

UNITED STATES PATENTS

| | | | |
|---|---|---|---|
| 3,026,285 | 3/1962 | Hirosawa, et al. | 260—78.4 |
| 3,209,500 | 10/1965 | Bernett | 260—37 |
| 3,275,587 | 11/1966 | Weller, et al. | 260—18 |

FOREIGN PATENTS

| | | |
|---|---|---|
| 1,227,643 | 10/1961 | France. |
| 905,725 | 9/1962 | Great Britain. |

OTHER REFERENCES

W. V. Sidgwick, "The Organic Chemistry of Nitrogen," 3rd ed., Oxford, Clarendon Pres (1966) p. 115.

MORRIS LIEBMAN, Primary Examiner

L. T. JACOBS, Assistant Examiner

U.S. Cl. X.R.

106—288; 260—37, 30.4, 32.8, 47

UNITED STATES PATENT OFFICE
CERTIFICATE OF CORRECTION

Patent No. 3,468,830　　　　　Dated 23 September 1969

Inventor(s) Erika Kiss

It is certified that error appears in the above-identified patent and that said Letters Patent are hereby corrected as shown below:

Column 1, in the heading, "August 26, 1966" should read -- August 29, 1966 --.

Column 3, line 7, "amine" should read --amino--.

Column 5, line 18, "followning" should read --following--.
" formula (5), line 40, right side of the formula should appear as follows:

$$-- \quad - C_5H_{10} - N = \overset{H}{C} - C_4H_9 \quad --$$

Column 6, formula (10), after the top of the large right-hand bracket, the formula should read:

$$-- \quad - C_2H_4 - N = \overset{H}{\underset{|}{C}} \quad --$$

Column 7, formula (24), the "H" before the final "=" should be -- N --.

Formula (25), show a double bond before the ring, as follows: 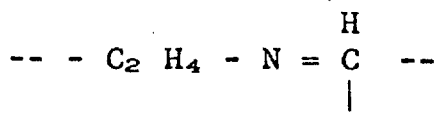

In the very center of formula (26), the " - C - " should be --  --

Column 10, line 45, "eladic" should be --elaidic--.

( Continued )

Column 13, line 74, "triethylanetetramine" should be
-- triethylenetetramine --.

Column 16, line 41, "Table I" should read -- Table II --.

Claim 1, line 14, "hydroscopic" should be
-- hygroscopic -- .

SIGNED AND
SEALED
MAY 26 1970

WILLIAM E. SCHUYLER, JR.
Commissioner of Patents